May 27, 1958
B. E. DAVIS ET AL
2,836,794
PULSE REPRESENTATION OF VARIABLE VOLTAGE
Filed March 26, 1957
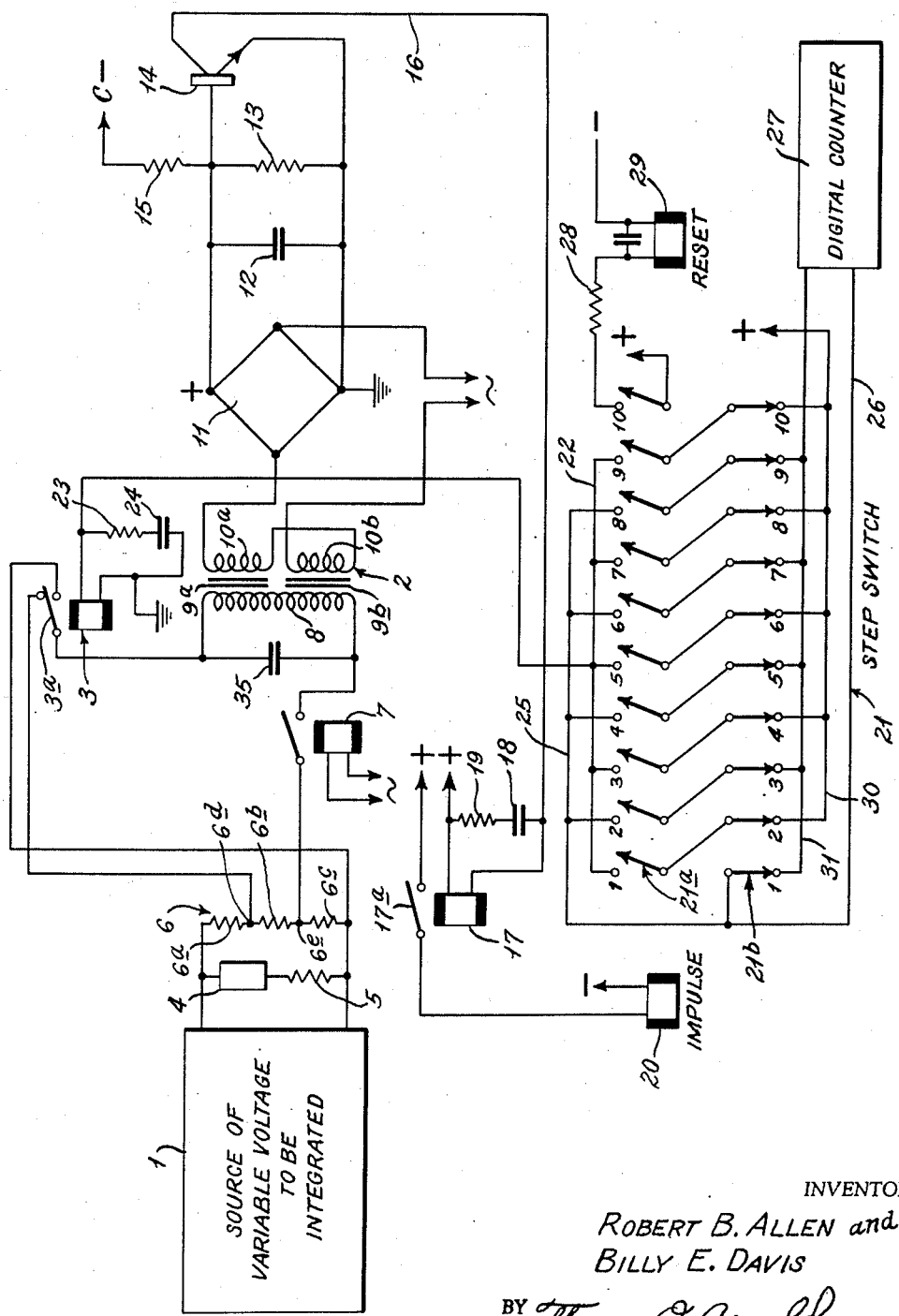
INVENTORS
ROBERT B. ALLEN and
BILLY E. DAVIS
BY Thomas O. Arnold
ATTORNEY

United States Patent Office

2,836,794
Patented May 27, 1958

2,836,794

PULSE REPRESENTATION OF VARIABLE VOLTAGE

Billy E. Davis and Robert B. Allen, Houston, Tex., assignors to Southwestern Industrial Electronics Company, Houston, Tex., a corporation of Delaware Application March 26, 1957, Serial No. 648,698

6 Claims. (Cl. 324—117)

This invention relates to pulse train representation of a variable D.-C. voltage, and, more particularly, to generation of a train of pulses of repetition rate representative of the amplitude of the input voltage, particularly for integration of the voltage.

In measuring and computing work it is often desirable to integrate a characteristic of a system under investigation. For instance in measurement of fluid flow (e. g., gas) through a pipe, the flow rate may be converted into a measurement of the quantity or volume of fluid delivered, by integration of the flow rate with respect to time. Since electromechanical transducers, or other sources of variable voltages, are so often used in measuring and computing work, it is desirable to be able to integrate a variable voltage with respect to time.

Several different general types of voltage integrators have been proposed and are available today. One such type is mechanical in nature and subject to several disadvantages, including slowness of response. Another type is electrical and uses an R-C circuit, either by itself, or in conjunction with an amplifier to form a feedback path. This type of circuit, while rapid in response, is only approximately accurate, unless rather elaborate correcting circuits are used.

It has also been suggested that a magnetic amplifier be used for integration, a capacitor being used to couple the output of the amplifier to the feedback coil of the amplifier. This latter, in general, is merely an adaptation of the capacitor feedback idea mentioned above.

The method and apparatus of the present invention employs the principles of what have come to be known as magnetic amplifier circuits, but not for their amplification characteristics, and not with capacitor feedback. The action of the magnetic amplifier, from the instant a voltage is furnished it until it saturates, is employed, with change in sense of the magnetomotive force in the amplifier core each time saturation is reached. The change in characteristics of the core when saturation is reached is employed to generate or develop a pulse at saturation, and the pulses may be counted to indicate the time integral of the voltage input.

An object of the invention, therefore, is to provide a train of voltage pulses whose repetition rate is representative of the amplitude of the input voltage. The pulses may be counted or summed, to derive a digital indication of the integral of the input voltage, or the period between pulses can be measured and digitally indicated, to provide a digital indication of the magnitude of the input voltage. The latter function may be performed by any appropriate digital period measuring device, such as those described in the patent to Kenyon, 2,414,107, issued January 14, 1947, the patent to Burbeck, 2,665,410, issued January 5, 1954, or the patent to Burbeck and Brooks, 2,738,461, issued March 13, 1956.

The apparatus of the invention, generally speaking, includes a non-feedback type magnetic amplifier, a switching device for causing the input voltage alternately to generate a magnetomotive force of one sense and the opposite sense in the amplifier core, means for developing a voltage pulse each time the core saturates, and means for operating the switching device at the same time the pulses are developed. In operation, this apparatus functions to develop an increasing magnetomotive force of one sense in the amplifier core until core saturation is reached, when a pulse of voltage is developed in the power coil of the amplifier, then to develop an increasing magnetomotive force of the opposite sense in the core until the core saturates, when another pulse of voltage is developed, and to repeat these steps successively. If integration of the input voltage is desired, the pulses are counted by a suitable digital summing device or counter.

The invention will now be described more fully in conjunction with the accompanying drawing.

In the drawing, the single figure is a schematic diagram of a preferred embodiment of the invention.

The input to the apparatus of the invention comprises a source of variable voltage indicated at 1 which may be, for instance, the output of a flow computer designed to provide a direct current voltage whose amplitude is representative of the flow rate of fluid through a pipe. Of course, any other source of D.-C. voltage may be used as the input to the apparatus. The input voltage, which might also be termed an analog voltage, is supplied to a magnetic amplifier generally indicated at 2 by means including a switching device shown as relay 3.

Connected across the source of variable voltage is the series combination of a thermistor 4 and a resistor 5. The thermistor 4 is provided to supply temperature compensation for the apparatus. In shunt to the source of variable voltage is a tapped resistor generally indicated at 6 having sections $6a$—$6c$ provided by its two intermediate taps $6d$ and $6e$. Tap $6e$ is connected through the normally-open contacts of a delay relay 7 to one side of the control coil 8 of the magnetic amplifier 2. Delay relay 7 is provided to insure that the power supplied has time to get up to full voltage before the apparatus begins operation.

The other side of control coil 8 is connected to the movable contact $3a$ of relay 3, and, when the relay is open, a connection is made through the relay contacts to tap $6d$ of tapped resistor 6. When relay 3 is energized, a connection is made from movable contact $3a$ to the lower end of tapped resistor 6. Therefore, the polarity of the voltage supplied the control winding 8 of the magnetic amplifier when the relay 3 is energized is opposite to that supplied when the relay is de-energized.

As is conventional, the magnetic amplifier has a single control winding which is wound on a pair of separate cores indicated at $9a$ and $9b$. In order to prevent the power coil of the magnetic amplifier from influencing the control coil action, the power coil consists of two windings $10a$ and $10b$, which are wound on cores $9a$ and $9b$, respectively. As is conventional also, the coils $10a$ and $10b$ are connected in such manner that power frequency voltage which is induced in control coil 8 by current in power coil $10a$ is bucked and cancelled by that induced by current in power coil $10b$.

The series combination of an appropriate source of alternating current power voltage (not shown) and power windings $10a$ and $10b$ are connected across a rectifier bridge indicated generally at 11. The other diagonal contacts of the bridge are connected across the parallel combination of a capacitor 12 and a resistor 13. Capacitor 12 and resistor 13 therefore furnish the load for the magnetic amplifier.

The magnetic amplifier described above is obviously of conventional form, and is known as a basic non-feedback type magnetic amplifier.

The ground side of the bridge 11 is connected to the emitter of an NPN transistor 14. The base of the transistor is connected to the opposite side of the bridge, so that the base-emitter circuit of the transistor is composed of the parallel connection of the bridge output and the load 12 and 13, of the magnetic amplifier. An appropriate negative bias for the transistor is provided by a source of negative voltage (not shown) connected in series with a resistor 15 to the base of the transistor.

The collector of the transistor is connected by a lead 16 through the operating coil of a relay 17 to a source of appropriate magnitude positive voltage (not shown).

The resistor 15 is provided in the circuit to compensate for the quiescent output of the bridge 11, that is, the output that is derived before the control current through winding 8 of the magnetic amplifier becomes high enough that the cores 9a and 9b become saturated. The negative bias supplied to the base of the transistor is then sufficient so that the collector current of the transistor is insufficient to operate the relay. In other words, relay 17 is not actuated until the cores 9a and 9b of the magnetic amplifier become saturated.

The series combination of a capacitor 18 and a resistor 19 is connected across the winding of relay 17, in order to smooth the operating energy supplied to the relay coil.

The contacts 17a of relay 17 are normally open, and are closed when the relay is operated, to connect the impulse coil 20 of a step switch generally indicated at 21, across a source of voltage (not shown). The step switch 21 comprises two sections each including 10 movable contacts and 10 stationary contacts. The movable contacts of one set are generally indicated at 21a, while the movable contacts of the other set are generally indicated at 21b. The stationary contacts of each set are indicated by numbers appropriate to the step of the step switch which they represent, the contacts being labelled from 1 to 10.

The odd contacts of the set of stationary contacts corresponding to movable contacts 21a are connected to a common bus 22 which is in turn connected to one side of the operating coil of switch relay 3. The other side of the switch relay is connected to ground, and the series combination of resistor 23 and capacitor 24 is connected across the coil of relay 3, for the same purpose that corresponding elements 18 and 19 are connected across relay 17. The even contacts of the stationary contacts corresponding to movable contacts 21a, with the exception of the tenth contact, are all connected to a common bus 25 which in turn is connected by lead 26 to one side of a digital counter 27. This tenth contact is connected through the series combination of a resistor 28 and a reset coil 29 to the negative side of a source of operating voltage for the reset coil. The tenth movable contact 21a is connected to the positive side of that source of voltage (not shown).

The even contacts of the stationary contacts corresponding to movable contacts 21b are connected to a common bus 30 which is connected to the positive side of a suitable source of operating voltage for relay 3 (not shown). The odd contacts of the same set are connected to a common bus 31 which in turn is connected to the other side of digital counter 27.

The movable contacts of the set 21a from the first through the ninth are connected to the next higher contacts, successively, of the set 21b, the first of movable contacts 21a being connected to the second of movable contacts 21b, etc. The first movable contact 21b is connected through lead 26 to the digital counter.

In the condition of the step switch shown, which is the condition immediately after reset, all of the contacts 21a are out of engagement with their stationary contacts, while all of the contacts 21b are in engagement with their stationary contacts. When the impulse coil 20 is first pulsed, the first contact of the set 21a moves into engagement with its stationary contact and the first contact of the set 21b moves out of engagement with its stationary contact. The next time the coil is pulsed, the second contact of the set 21a engages its stationary contact and the second contact of the set 21b disengages its contact, the first contacts remaining in their engaged and disengaged positions, respectively. The steps progress in this manner through the ninth step, when all of the first nine contacts of the set 21a are engaged and all of the first nine contacts of the set 21b disengaged.

When the impulse coil is pulsed for the tenth step, the tenth contact of the set 21a is engaged with its stationary contact, thus completing an energizing circuit for reset coil 29. The step switch then returns to the condition shown in the drawing.

It will be evident that operation of the step switch could be started at any step, rather than immediately after reset.

In operation of the apparatus above described, when a source of variable voltage is impressed across tapped resistor 6 and delay relay 7 closes its contacts, the voltage between tap 6e and tap 6d is impressed across the control winding 8 of the magnetic amplifier 2. The current through the control winding increases exponentially with increasing time until the cores of the magnetic amplifier are saturated. Then, the magnetic amplifier develops a pulse of voltage across its load consisting of resistor 13 and capacitor 12, this pulse being sufficient to cause the transistor 14 to conduct a collector current sufficient to operate relay 17. When relay 17 is operated, the impulse coil 20 of the step switch 21 is pulsed to complete a circuit from ground, through the operating coil of switch relay 3 and common bus 22, and through the first movable contact 21a and the second movable contact 21b to common bus 30 and the positive side of a source of voltage for relay 3.

The switch relay 3 then operates to close its normally open contacts, so that the voltage between tap 6e and the lower end of the tapped resistor 6 is connected across the control winding 8. Since this voltage is of opposite polarity to that previously connected across the coil, a current of opposite direction flows through the coil and a magnetomotive force of opposite sense or polarity is developed in each of cores 9a and 9b. This current through coil 8 and the magnetomotive force in the two cores builds up exponentially again, until saturation is reached, when a pulse of voltage is developed across the load of the magnetic amplifier and the transistor 14 again conducts sufficient current to cause relay 17 to operate. At the moment that relay 3 operates, relay 17 of course opens, since the voltage output of the magnetic amplifier at this time is insufficient to allow a high enough collector current to flow to energize relay 17.

When relay 17 energizes again, the impulse coil 20 is again pulsed, to open the energizing circuit for switch relay 3, and a circuit is closed across the input to digital counter 27. The digital counter may be of any conventional type which is operative by closure of a circuit across its input to advance the digit count of the counter. Since digital counters of this type are so common in the art and so many different ones can be used, the particular characteristics of the digital counter need not be further described here. At any rate, at this time, the digital counter advances its count by one unit.

At the same time that the counter advanced its count, the operating circuit for relay 3 was opened, so the relay reverts to its original condition with its normally-closed contacts connecting the voltage between taps 6d and 6e across control winding 8. The apparatus then functions as before, with the magnetomotive force being reversed in the cores 9a and 9b each time the relay 3 is operated, and the relay 3 being changed in condition from its open condition to its operated condition, and back, each time a pulse of voltage is developed by the magnetic amplifier sufficient to operate relay 17.

With the apparatus above described, it is evident that the number of pulses in the pulse train developed by the magnetic amplifier 2 is counted continuously by digital counter 27. The digital counter therefore provides a digital indication of the time integral of the magnitude of the D.-C. input voltage. As indicated above, the train of pulses, whose repetition rate necessarily corresponds to the magnitude of the input voltage, could be used for some other purpose.

The drawing shows a capacitor 35 connected across the control coil 8 of the magnetic amplifier 2. The capacitor has not previously been referred to because it performs no important function in the operation of the apparatus. This capacitor is merely provided to prevent arcing of the contacts of switch relay 3 during the reversal of the direction of current through winding 8.

The method and apparatus above described are to be understood to be preferred embodiments of the invention. Actually, any appropriate type of pulse divider other than the step switch 21 could be used and the step switch could be differently connected to achieve any desired scaling factor between the number of pulses and the result indicated on the counter. It will be evident from the connections described that one count is made for each two pulses, for the illustrated apparatus. This, of course, can be compensated for in the counter, or the results read with the compensation in mind.

It will be evident that many other changes could be made in both the method and apparatus without departure from the scope of the invention. Therefore, the invention is not to be considered limited to the method or apparatus specifically described, but rather only by the scope of the appended claims.

We claim:

1. Apparatus for furnishing a train of voltage pulses of repetition rate proportional to the amplitude of a D.-C. input voltage comprising a magnetic amplifier including a saturable core, a control coil and a power coil, switch means operable in one condition to connect the input voltage across the control coil in one sense and operable in another condition to connect the input voltage across the control coil in the opposite sense, means connected to the power coil operable to furnish a voltage pulse each time the core of the magnetic amplifier saturates, and means responsive to the output of said last-named means for changing the condition of said switch means each time a pulse is furnished.

2. The apparatus of claim 1 in which said means connected to the power coil includes an electronic amplifier operable to develop a pulse of voltage when the core saturates.

3. The apparatus of claim 1 in which said switch means is a relay and in which said means for changing the condition of said switch means is a pulse divider.

4. Apparatus for integrating with respect to time a variable voltage D.-C. input comprising a magnetic amplifier, switch means operable in one condition to connect the input voltage across the control coil of the magnetic amplifier in one sense and operable in another condition to connect the input voltage across the control coil in the opposite sense, means connected to the output of the magnetic amplifier operable to furnish a voltage pulse each time the core of the magnetic amplifier saturates, means responsive to the output of said last-named means for changing the condition of said switch means each time a pulse is furnished, and means for counting said pulses.

5. Apparatus for integrating with respect to time a variable voltage D.-C. input comprising a magnetic amplifier having an input and an output, means including a relay operable when open to connect the input voltage to the amplifier input with one polarity and operable when closed to connect the input voltage to the amplifier input with the opposite polarity, means connected to the amplifier output operable to develop a voltage pulse each time the core of the magnetic amplifier saturates, means for counting said pulses, and means for energizing said relay operable by every second one of said pulses.

6. The apparatus of claim 5 in which said pulse-developing means is an electronic amplifier having its input connected to the output of the magnetic amplifier, and said means for energizing the relay includes a step switch, said counting means being connected to said step switch.

References Cited in the file of this patent
UNITED STATES PATENTS
2,637,820    McCreary _____ May 5, 1953